United States Patent [19]

Willibald

[11] Patent Number: 4,781,037
[45] Date of Patent: Nov. 1, 1988

[54] FASTENER UNIT FOR JEWELRY

[75] Inventor: Kopper Willibald, Worms-Horchheim, Fed. Rep. of Germany

[73] Assignee: Allgemeine Gold-und Silberscheideanstalt AG, Pforzheim, Fed. Rep. of Germany

[21] Appl. No.: 916,722

[22] Filed: Oct. 1, 1986

Related U.S. Application Data

[63] Continuation-in-part of PCT DE85/00547, Dec. 20, 1985, published as WO86/04492, Aug. 14, 1986.

[30] Foreign Application Priority Data

Feb. 5, 1985 [DE] Fed. Rep. of Germany ....... 3503790

[51] Int. Cl.[4] .......................... A44C 11/02; A44C 7/00
[52] U.S. Cl. .............................................. 63/13; 63/4; 24/232 R; 59/89
[58] Field of Search ...... D3/65; 24/232 R, 230.5 TP, 24/231, 241 S, 241 P, 241 SP, 230.5 AD; 59/89; 63/12, 13, 4

[56] References Cited

U.S. PATENT DOCUMENTS

| | | | |
|---|---|---|---|
| D. 180,223 | 5/1957 | Cousins | D3/65 |
| 725,235 | 4/1903 | Farmer | 24/232 |
| 1,382,849 | 6/1921 | Perl | 24/232 |
| 1,540,030 | 6/1925 | Mestars . | |
| 1,637,699 | 8/1927 | Lauterbach . | |
| 3,590,443 | 7/1971 | Kubsch | 24/232 |
| 3,599,298 | 8/1971 | Anderson | 24/232 |

FOREIGN PATENT DOCUMENTS

| | | |
|---|---|---|
| 28554 | 5/1907 | Austria . |
| 261334 | 5/1912 | Fed. Rep. of Germany . |
| 499892 | 12/1919 | France . |
| 7269 | of 1900 | United Kingdom ................. 24/232 |

Primary Examiner—Richard J. Johnson
Attorney, Agent, or Firm—Horst M. Kasper

[57] ABSTRACT

In a one-piece fastener, particularly for jewelry, which consists of two fastening members which are mounted at their one end for pivoting in a common axis of rotation and can be detachably connected at their other ends, one fastening member is constructed in the form of an inherently resilient double hook (2) with hook openings (8, 10) directed oppositely at each side of the tension axis (24) and the other fastening member is constructed in the form of a hinged locking means (1), the double hook being articulated on the hinged locking means (1) by one hook end being able to be frictionally secured in position on the hinged locking means (1) by its other end, through a detent (5) and a counter detent (7). Double hook (2) and hinged locking means (1) are pivotable through 360 degrees, crossing over and passing the detent, for the opening and closing of the fastener and are so constructed that a pivotal movement in one direction opens one hook opening (9) and closes the other (10) and vice versa. In the closed state, the fastener with its simple construction, forms a connection which can be particularly loaded in tension and can take up relatively high tensile forces despite a light form of construction.

39 Claims, 5 Drawing Sheets

FASTENER UNIT FOR JEWELRY

CROSS-REFERENCE TO RELATED APPLICATIONS

This application is a continuation-in-part application of another international application filed under the Patent Cooperation Treaty Dec. 20, 1985, bearing Application No. PCT/DE85/00547, and listing the United States as a designated country. The entire disclosure of this latter application, including the drawings thereof, is hereby incorporated in this application as if fully set forth herein.

BACKGROUND OF THE INVENTION

1. Field of the Invention

The invention relates to a fastener unit, particularly for jewelry, which consists of two fastening members. The two fastening members are mounted for pivoting in a common pivotal axis at their one end and which can be detachably connected at their other ends.

2. Brief Description of the Background of the Invention Including Prior Art

Such one piece fasteners serve to connect together the ends of a string of pearls, of a necklace, or of bracelets, belts and the like. The connection should be reliable and provide easy handling of the fastener with a simple construction.

Known fasteners do not meet these requirements in an optimum manner.

Thus, in a known fastener for ornamental chains (DBGM No. 75 13 404) for example, the fastening members in the form of arms are pivotably connected to one another for pivoting about a common axis. The fastening members are provided, at their free ends, with cooperating detent elements which engage positively one behind the other in relation to an opening movement. Since the opening of the fastener is caused by a resilient deformation of the fastening members and the opening direction lies in the direction of the tension axis, the fastener can open in an undesired manner in the event of even relatively slight tensile forces.

SUMMARY OF THE INVENTION

1. Purposes of the Invention

It is an object of the invention to avoid the disadvantages of the prior art and to provide a fastener, which is simple in construction and handling and inexpensive to manufacture.

It is another object of the invention to furnish a fastener, which is reliable in locking and which cannot open automatically even under the action of relatively great tensile forces.

These and other objects and advantages of the present invention will become evident from the description which follows.

2. Brief Description of the Invention

The present invention provides a fastener unit for jewelry which in part comprises a first fastening member forming a double hook of inherently resilient construction, which has hook openings directed oppositely in mirror image at both sides of a tension pseudo-axis of the hook. A second fastening member has one hook end articulated on a hinged locking means forming the first fastening member. A pivoting mount for the first fastening member and for the second fastening member is disposed near a respective end of the first fastening member and of the second fastening member. The first fastening member and the second fastening member can be detachably connected at their other ends, such that the first fastening member can pivot versus the second fastening member around a common axis. A counter detent is disposed at a second end of the first fastening member, and a detent is disposed at the second end of the second fastening member for frictionally securing in position on the hinged locking means the first fastening member by its second end through the counter detent, where the first fastening member and the second fastening member hinged together are pivotable through 360 degrees crossing over for the opening and closing. The detent is so constructed that a pivotal movement in one direction opens one hook opening and closes the other and vice versa.

One hook opening can be opened by a pivotal movement of the first fastening member providing a double hook in one direction, disengaging it from the detent, and the other hook opening can be opened by the pivotal movement in the other direction, passing over the detent.

The second fastening member forming a hinged locking means can comprise arcuate portions which are directed in mirror image to the hook openings of the double hook and close the hook openings when the fastener is in a snap-in position.

The hinged locking means can be constructed in the form of a U-shaped yoke which, with its free ends, forms a common pivot bearing with one end of the double hook and surrounds this in the form of a gate and that disposed on the crosspiece of the yoke is a detent which cooperates with a counter detent on the other end of the double hook during the opening and closing.

The detent and the pivot mount bearing can be formed from opposite sides of a frame-like housing forming the second fastener member. The other two sides of the housing can form extended bearing end plates of the pivot mount bearing.

The pivot mount bearing can consist of a pivot pin forming the common axis of rotation of the hinged locking means and double hook with bearing end plates located on the ends of a pin and one end of the double hook mounted between the bearing end plates for free rotational movement in a bearing bore.

The bearing end plates can be formed from flat shaped parts disposed spaced parallelly apart and the bearing end plates of the hinged locking means can be of dished construction and can be provided with recesses to receive the detent and the pivot pin.

In one embodiment of the present invention, the bearing end plates can be constructed in the form of castings and where recesses are cast as integral eyes.

In another embodiment of the present invention, the bearing end plates can be constructed in the form of shaped sheet-metal parts, and recesses formed thereon are provided as eyes.

The bearing end plates can be connected to one another, with parallel spacing, through a pivot pin and detent pin each inserted in opposite eyes. Free edges of eyes can be bent over into annular grooves provided both in the detent pin and in the pivot pin for a rigid mutual connection of the bearing end plates. The detent pin and pivot pin can be riveted to the bearing end plates at their offset ends.

The pivot bearing can be formed from a pivot pin which forms the common axis of rotation of hinged locking means double hook and is fixed at one end of the double hook, and bearing bores which are provided in the bearing end plates and in which the ends of the pivot pin are held for rotation and wherein a pivot pin of the pivot bearing is formed integral on the end of the double hook opposite to the counter detent.

The double hook can be resiliently deformable in relation to the pivot mount bearing and can be constructed in the form of a flat shaped stamped sheet-metal part. Alternatively, the double hook can be a bent part made of spring wire.

The detent disposed on the hinged locking means can cooperate with the counter detent on the free end of the double hook as a radially acting spring-lever detent catch in a manner rendering it possible for the double hook to pass over the detent. The detent can comprise a detent pin connecting the bearing end plates, and the counter detent can comprise a detent notch or a detent depression. The detent notch can be substantially V-shaped and can be provided at the outer periphery of the double hook, and the V-shape of the detent notch can form an angle of about 90 degrees.

The hinged locking means can be made in one piece as a U-shaped stamped sheet-metal part and can be closed in the form of a frame by the pivot pin of the pivot bearing. The detent can be integrated in a crosspiece of the hinged locking means, situated opposite to the pivot bearing, and the detent can comprise a tongue which projects from the crosspiece and is folded over inwards to form a detent projection which is substantially triangular in cross-section.

Side portions including bearing end plates of the hinged locking means and the double hook can each have, in their end regions, holes which coincide in the snap-in position, for an inserted safety device.

In another embodiment, the side portions including bearing end plates of the hinged locking means can be constructed in the form of ornaments at their outer faces and can be decorated with jewels.

The side portions including bearing end plates of the hinged locking means can be shaped such that, in the snap-in position, they wholly or partially cover the hook openings of the double hook. The double hook can comprise a profile which is substantially rectangular in cross section and the hooks of the double hook are each provided with two recesses which recesses are disposed in the tension axis and in mirror image to each other at their sides adjacent to side portions, for attaching and securing flat connecting links. Suspension recesses of the connecting links can be substantually U-shaped in construction and, as a whole in their mirror image relationship, can form an H shape. Suspension openings of the connecting links can be similar in construction to the cross-section of the double hook and are shaped so that their length corresponds substantially to the height of the hook profile and their width corresponds substantially to the maximum width of the hook profile and the thickness of the web between the opposite recesses and, when the fastener is in the open position, the suspension links can be introduced into the hook openings with their suspension openings coinciding in position with the cross-section of the double hook and can be brought, by a subsequent pivotal movement through 90 degrees inside the recesses, into a locking position which, when the double hook is in the snap-in position, can be reached by coincidence between the hooks and the side portions including bearing end plates.

The jewelry fastener of the present invention can be formed as a pendant ear-ring. In this embodiment, the suspension opening adjacent to the detent catch and formed from the one hook opening and the arcuate portions of the hinged locking means directed in mirror image, can be larger than the suspension opening adjacent to the pivot bearing. The side walls of the hinged locking means can form an oval frame lying in the plane of the extent of the pivot bearing, and the frame can comprise substantially parallel portions in the region of the maximum width of the oval. The parallel side-wall portions are brought together in a roof shape forming the counter detent. Double hook and hinged locking means can comprise bent parts made of material in the form of wire. A flat ear ornament can be fitted to the walls of the hinged locking means in the region of the larger suspension opening, and the region of the double hook situated opposite to the region for fitting the flat ear ornament to the hinged locking means can be provided with a further fixed flat ear ornament. The further flat ear ornament can be oval in construction and can be so dimensioned that the pivotal mobility of the double hook crossing over the hinged locking means is ensured. Part hooks of the double hook starting from a point of the hinge and from a pint of the detent and going to the inflection point between the two part hooks can cover each with their curvature radii directions an angular range of at least about 135 degrees and preferably a range of at least about 180 degrees. The tangent of the double hook at the inflection point where the part hooks join can form an angle of at least about 45 degrees with a connection line between a point of the hinge and a point of the detent-counter detent and preferably an angle of at least about 60 degrees and more preferred an angle of the least about 90 degrees.

The first fastener member and the second fastening member can have substantially the shape of a figure 8 in a snap-in position and when viewed in the pivotal plane.

In another embodiment of the present invention, the first fastening member of the jewelry fastener can be provided as a key holder.

Another aspect of the present invention provides a fastener unit comprising a hinge disposed at a hinge axis, a frame supporting the hinge at the hinge axis, a double hook hinged near one end at the hinge axis, a detent provided at a part of the frame remote relative to the hinge point, and a counter detent provided at the double hook near its second end for engaging the detent and thereby locking the fastener. The double hook can rotate by about 360 degrees around the hinge axis versus the frame such that each opening of the double hook is accessible for toroidal material to be placed on a respective hook end and to be held by the fastener after engagement of detent and counter detent.

The present invention solves a problem of securely and conveniently fastening jewelry with a fastener wherein one fastening portion consists of a double hook which is made resilient in itself and has hook openings oppositely directed in mirror image at both sides of the tension axis and is articulated, by one hook end, on a hinged locking means forming the other fastening portion and can be frictionally held in position, on the hinged locking means by its other end, through a detent and a counter detent, the double hook and the hinged locking means being pivotable through 360 degrees, crossing over one another, for the opening and closing and being so constructed that a pivotal movement in one direction opens one hook opening and closes the other and vice versa. In the course of this, the one hook opening may appropriately be able to be opened by the disengaging pivotal movement of the double hook in one direction and the other hook opening may be able to be opened by the pivotal movement beyond the detent in the other direction, while in the snap-in position of the fastener, the hook openings are closed by the fact that the hinged locking means comprises arcuate portions directed in mirror image to the hook openings of the double hook.

The fastener according to the invention is particularly simple in construction and, in the closed state (snap-in position) forms a connection which can be particularly loaded in tension and which can take up relatively high tensile forces with a light form of construction. As a result of the simple form of construction of the fastener, particularly inexpensive manufacture is possible.

According to an advantageous development of the fastener according to the invention, the hinged locking means may be constructed in the form of a U-shaped yoke which, with its free end, forms a common pivot bearing the one end of the double hook and surrounds this in the form of a gate, and disposed on the crosspiece of the yoke there may be a detent which cooperates with a counter detent on the free end of the double hook during the opening and closing. In this case, detent and pivot bearing may advantageously be formed from opposite sides of a frame-like housing (hinged closing means) with the other two sides of the housing forming extended end plates of the pivot bearing. The pivot bearing may consist, in a simple manner, of a pivot pin forming the common pivotal axis of hinged locking means and double hook, with end plates fixed to the ends of the pin and one end of the double hook mounted between the end plates for free rotational movement in a bearing bore.

Different forms of embodiment may be appropriate according to the manufacturing possibilities present and the intended application. Accordingly, the end plates may be formed from shaped parts disposed with parallel spacing from one another or may be of dished construction and provided with recesses to receive detent and pivot pin. A construction of the end plates in the form of cast parts or shaped sheet-metal parts is also conceivable, in which case eyes cast on or formed thereon may be provided as recesses. The mutual connection of the end plates with parallel spacing may appropriately be effected through a pivot pin and detent pin each inserted in opposite eyes. According to the manufacturing possibility, the free edges of the eyes may be beaded over into annular grooves provided in the detent pin and pivot pin for the mutual connection of the end plates, or detent pin and pivot pin may be riveted to the end plates of their stepped ends. Both possibilities lead to a stable construction of the hinged locking means. Within the scope of the different manufacturing possibilities mentioned however, a pivot bearing may also be used in an advantageous further development of the invention, which pivot bearing is formed from a pivot pin forming the common axis of rotation of hinged locking means and double hook, is fixed to one end of the double hook, and bears bores provided on the end plates, in which bores the ends of the pivot pins are held for rotation. In this case, in order to reduce the assembly expense to a minimum, the pivot pin of the pivot bearing may be formed as an integral part on the end of the double hook opposite to the counter detent. The double hook, which, according to the invention, can be resiliently deformed in relation to the pivot bearing in the snap-in position may further be constructed in the form of a flat shaped sheet-metal part and may appropriately be a stamped part, but it may also be made as a bent part from spring wire.

The high degree of reliability against unwanted opening even with relatively great tensile forces which is provided by the fastener of the present invention is achieved in an advantageous manner by the cooperation of the detent disposed on the hinged locking means with the counter detent on the free end of the double hook in a manner known per se as a spring-lever detent catch, acting radially in a manner enabling the double hook to pass beyond the detent. Thus forces acting in the tension axis of the fastener increase the holding force of the fastener in the snap-in position and only radial forces, that is to say, forces directed perpendicular or at an angle to the tension axis, can reduce the holding forces so as to open the fastener. A form of embodiment for a spring-lever detent catch is particularly simple in design where the detent consists of a detent pin connecting the end plates and the counter detent consists of a detent notch or a detent depression on the double hook, the detent notch advantageously being substantially V-shaped and being disposed at the outer periphery of the double hook and preferably forming an angle of about 90 degrees.

It is particularly favorable from the manufacturing point of view if, in a further development of the invention, the hinged locking means is made in one piece as a U-shaped sheet-metal part, particularly as a stamped part and is closed in the form of a frame by the pivot pin of the pivot bearing. With this construction, the detent can, to advantage, be integrated in the crosspiece of the hinged locking means situated opposite to the pivot bearing for example in that the detent consists of a tongue projecting from the crosspiece and folded over inwards forming a detent projection which is substantially triangular in cross-section.

According to a further development of the invention, the lateral portions (end plates) of the hinged locking means and of the double hook may each have holes in their end regions, which holes coincide in the snap-in position for an inserted safety device. The lateral portions (end plates) of the hinged locking means may also be constructed in the form of adornments at their outer faces and/or be decorated with jewels. By this means, the aesthetic appearance of the fastener can also be adapted to a great extent to the character of its intended purposes. Finally, the lateral portions (end plates) of the hinged locking means may, to advantage, be formed so that they wholly or partially cover the hook openings of the double hook in the snap-in position. With complete coverage, the lateral portions are particularly suitable as adornments, but if the fastener is used as a connector for chain links, connecting eyes and the like, precautions must be taken to ensure that the connecting eyes, after being suspended in the hooks, do not hamper the pivotal movement of the fastening portions, particularly in the snap-in position.

For this purpose, according to a further advantageous development of the invention, the double hook consists of a profile which is substantially rectangular in cross-section and the hooks are each provided with two recesses disposed in the tension axis and in mirror image at their sides adjacent to the lateral portions, for the suspension and securing of flat connecting links. It is an advantage if the suspension recesses are made substantially U-shaped and form an H-shape as a whole in their mirror-image relationship. The mutual dimensions and tolerances may, to advantage, be selected so that the suspension openings of the connecting links are similar in construction to the cross-sectional profile of the double hook and are formed so that their length (X) corresponds substantially to the height (X') of the hook profile and their width (Y) corresponds substantially to the maximum width (Y') of the hook profile and the thickness (Y") of the web between the opposite recesses. When the fastener is in the open position, this construction makes it possible for the suspension links to be introduced into the hook openings with their suspension openings coinciding in position with the cross-sectional profile of the double hook and to be brought into the locking position by a subsequent pivotal movement through 90 degrees inside the recess, which locking position can be reached in the snap-in position of the double hook by coincidence of the lateral portions (end plates) with the hooks.

The fastener according to the invention permits a multiplicity of possible applications. For use as a pendant ear-ring for example, the suspension opening adjacent to the detent catch and formed from the one hook opening and the arcuate portions of the hinged locking means directed in mirror image may advantageously be larger than the suspension opening adjacent to the pivot bearing. The side walls may advantageously form an oval frame which lies in the plane in which the pivot bearing extends and which may appropriately comprise, in the region of the maximum width of the oval, substantially parallel portions which can be brought together in a roof shape forming the counter detent. For easy handling as a pendant ear-ring, it is an advantage if the double hook locking means consist of bent portions of material in form of a wire.

A flat ear ornament may also be able to be clipped on to the side walls of the hinged locking means in the region of the larger suspension opening, and the region of the double hook situated opposite to this clip-on region may, in a further advantageous development, be provided with a further fixed flat ear-ornament which may appropriately be oval in construction and which is so dimensioned that the crossing-over pivotal movement of double hook and hinged locking means is assured. This construction makes the pendant ear-ring universally usable, both as a result of the possibility of exchanging the flat ear ornaments and by wearing it on the ear with the sides reversed.

According to a preferred embodiment of the fastener, it may have substantially the shape of a figure 8 in the snap-in position and looking towards the pivotal plane.

According to a further advantageous use, the fastener according to the invention may serve as a key tag.

The invention permits numerous forms of embodiment and possible uses. In order to further clarify the basic principle, some of them are illustrated by way of example in the drawings and then explained in more detail.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
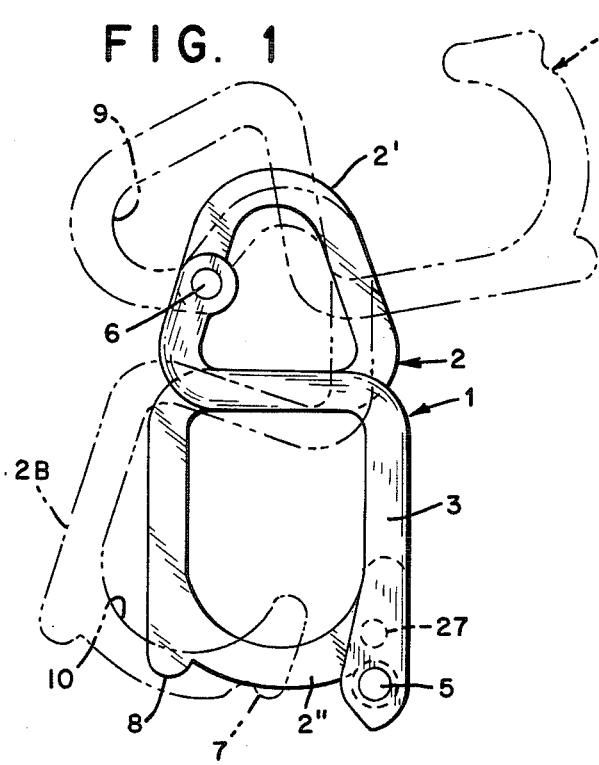
FIG. 1 shows a front view of the fastener according to the invention.
Figure 2:
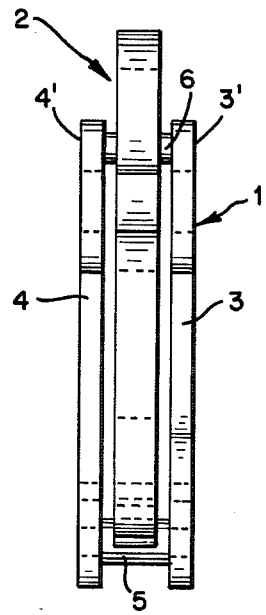
FIG. 2 shows an associated side view.

FIGS. 1 and 2 show, in solid lines, a fastener in the closed state (snap-in position). The fastener consists essentially of a hinged locking means designated in general by 1 and a double hook 2 of inherently resilient construction. The hinged locking means 1 represents a relatively rigid frame-like structure consisting of two side portions 3, 4 disposed spaced parallelly apart, coinciding with one another, in the form of a stylized S (FIG. 1) and a detent pin 5 as well as a pivot pin 6 for the rigid connection of the ends of the side portions.

The side portions 3, 4, which serve as bearing endplates at the same time, form, in the region of the pivot pin 6, a pivot bearing for the double hook 2, which is likewise constructed in the form of an S but in mirror image to the S-shape of the side portions and mounted for rotation, by the end of a hook 2', on the pin 6. The detent pin 5, together with a detent notch 7 provided at the end of the other hook 2", forms a radially acting spring-lever detent catch, the double hook representing the spring lever. By means of a finger-hold 8 on the hook 2", the double hook can easily be brought into the snap-in position (FIGS. 1 and 2) by resilient compression of the double hook in the direction of the pivot bearing and in the reverse sequence for opening the fastener. In the course of this, the hinged locking means 1 and double hook 2 can each be turned through 360 degrees about the pivotal axis formed by the pivot pin 6, crossing over one another and passing beyond the detent and be locked in the snap-in position by closing two coinciding holes 27 by means of a locking means not illustrated.

The mode of action will be explained with reference to the positions of the double hook shown in dot-dashed line.

The double hook is first released from the closed (snap-in) position of the fastener in the counter-clockwise direction of rotation and pivoted approximately into the position designated by 2A for the suspension of a part (not illustrated), for example a chain link or an eye, in the hook opening designated by 9. Subsequent pivoting in clockwise direction, beyond the detent, into the other position illustrated in chain line and designated by 2B serves to suspend the other part in the other hook opening 10. With a renewed pivotal movement of the double hook in counter-clockwise direction into the closed snap-in position (FIGS. 1 and 2), the fastener is closed. During the opening of the fastener, the operation is completed in a similar manner in the reverse sequence. The more or less stylized 8 (eight) shape of the fastener, which can be seen from FIGS. 1, 3, 5, 7 and 12, results from the mirror-image relationship or hinged locking means and double hook, depending on the extent of overlapping of the side portions in relation to the double hook in the snap-in position. In the alternative forms of embodiment of the fastener according to the invention described below, the same or equivalent parts to the embodiment shown in FIGS. 1 and 2 are provided with the same reference numerals but increased by a hundred or several hundred.

Figure 4:
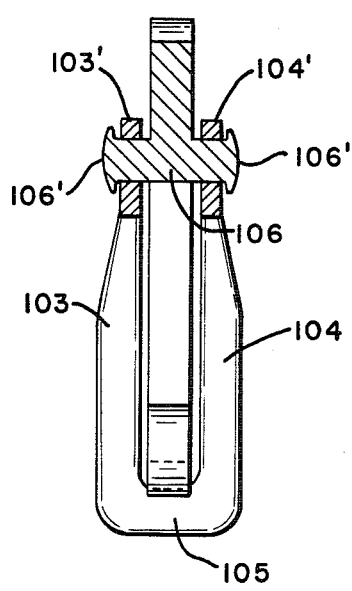
FIG. 4 shows a side view of the fastener in partial section on the line IV—IV in FIG. 3.
Figure 3:
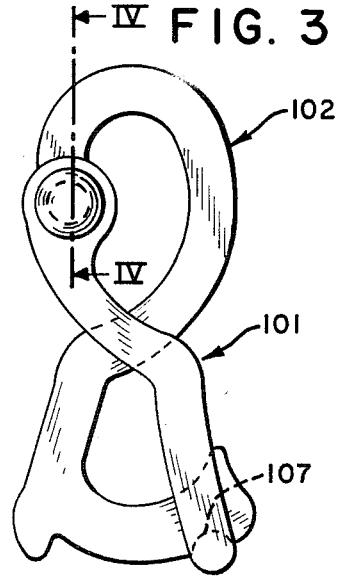
FIG. 3 shows a further form of embodiment of the fastener according to the invention, in front view.

The fastener shown in FIGS. 3 and 4 is made from material in the form of wire. Side portions 103, 104 of the hinged locking means 101, which are bent into the shape of a U with a crosspiece forming the detent pint 105, have ends 103', 104', which are flattened by upsetting and which serve as bearing eyes to receive the pivot pin 106 made integral with the double hook 102. The ends of the pivot pin emerging at both sides and serving as a pivot bearing for the double hook 102 are provided, during the assembly of hinged locking means 101 and double hook 102, with upset heads 106' to make and secure the fastener in one piece and to achieve and ensure the free and relative rotatability of the two fastening portions (101, 102).

Figure 5:
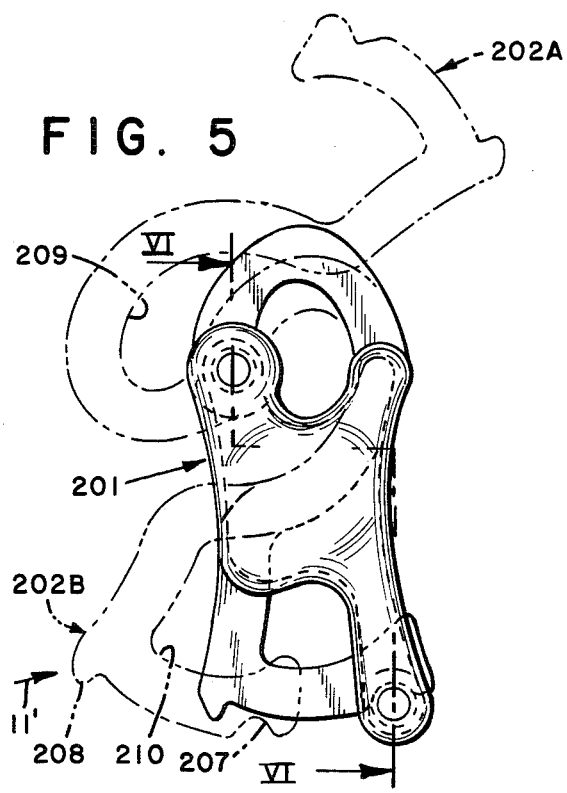
FIG. 5 shows a further form of embodiment of the fastener according to the invention, in front view.
Figure 6:
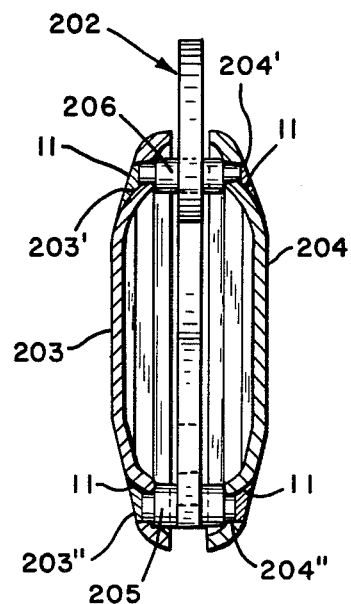
FIG. 6 shows the fastener in section on the line VI—VI in FIG. 5.

In the fastener shown in FIGS. 5 and 6, the side portions 203, 204 of the hinged locking means 201 are made dish-shaped as castings or by shaping sheet-metal parts which have been produced (shaped stamped metal parts). Eyes 203', 204" and 203", 204"', which are cast as integral parts or formed later in the region of the pivot bearing and detent catch respectively serve to receive the pivot pin 206 and detent pin 205, by means of which the side parts are connected to one another with parallel spacing and receive between them the double hook 202 which is mounted on the pivot pin 206 for providing free rotation. The side portions are connected by riveting. For this purpose, the ends of pivot pin 206 and detent pin 205, which are offset in diameter, engage in corresponding hole recesses inside the eyes, and their ends emerging at both sides are each riveted in funnel-shaped formations of the hole recesses at 11, the rivet heads subsequently being ground flush with the surface of the side portions 203, 204.

The double hook 202, which is constructed approximately like the number 5 and is inherently resilient and freely rotatable through 360 degrees beyond the detent is frictionally held in position on the detent pin 205 by its detent notch 207 in the closed position (snap-in position). In order to attach connecting eyes, for example to connected two ends of a chain, the double hook 202 is first pivoted, by finger pressure on the finger-hold 208 in the direction of the arrow 11, out of the snap-position in clockwise direction into the position designated by 202A, here an eye, not illustrated, can be suspended in the hook opening 209. Then the double hook is pivoted, simultaneously passing the detent, in counter-clockwise direction, approximately into the position 202B shown in dot-dashed line, for the suspension of an eye, not illustrated, in the other hook opening 310.

Figure 7:
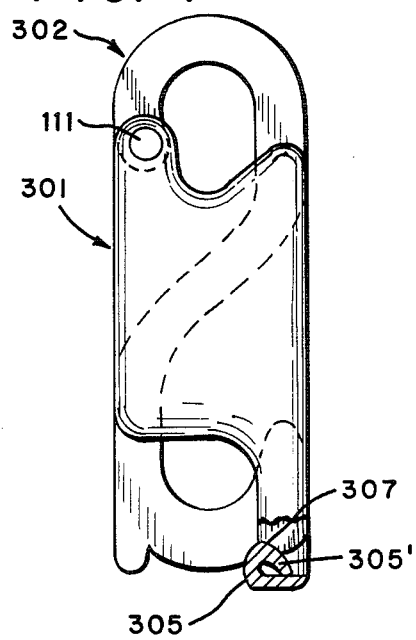
FIG. 7 shows a further form of embodiment of the fastener according to the invention, in front view.
Figure 8:
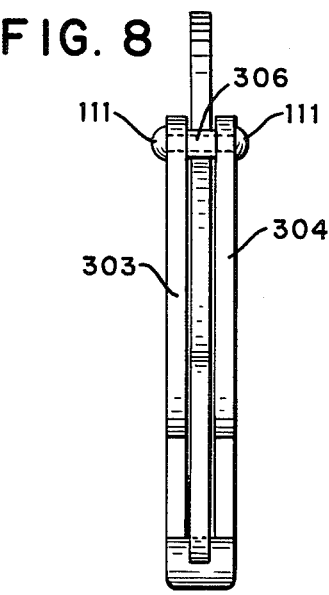
FIG. 8 shows the associated side view.

In the further example of an embodiment of a fastener as shown in FIGS. 7 and 8, the hinged locking means 301 is made in the form of a U-shaped combined stamped and bent part of sheet metal as in FIGS. 3 and 4, with the side portions 303, 304. The S-shaped, inherently resilient double hook 302 is mounted, by means of the pivot pin 306, for pivotal movement on the free ends of the side portions 303, 304 and is axially located and rotatable at 111 through headed riveting at the ends of the pivot pin emerging beyond the side portions at both sides, The detent catch for locking the double hook to the hinged locking means consists of a detent depression 307 provided at the outer periphery of the hook and a detent projection 305 which is formed from a tongue 305' projecting from the crosspiece of the U-shaped hinged locking means and folded inwards.

Figure 9:
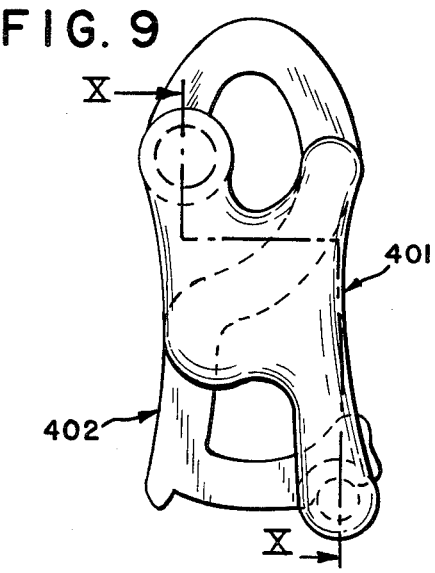
FIG. 9 shows a further form of embodiment of the fastener according to the invention, in front view.
Figure 10:
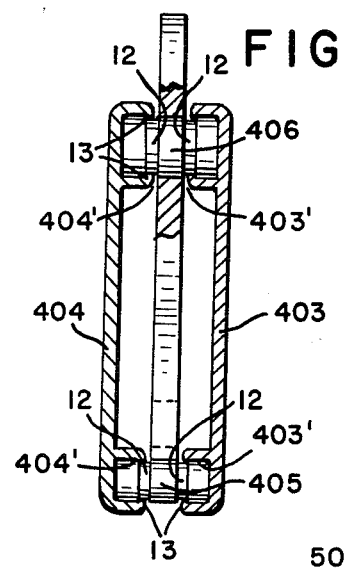
FIG. 10 shows the fastener in section on the line X—X in FIG. 9.

The fastener illustrated in FIGS. 9 and 10 has a hinged locking means 401, which is similar in construction to that of FIGS. 5, 6, consisting of dished side portions 403, 404, which are secured in position in relation to one another, with parallel spacing through a pivot pin 406 and detent pin 405 received in subsequently formed eyes 403', 404' and which receive between the double hook 402 mounted for rotation on the pivot pin. Detent pin 405 and pivot pin 406 are each provided with two annular grooves 12 which are spaced apart by substantially the thickness of the double hook 402 and in which the free edges of the eyes 403', 404' are bent over at 13, spacing the side portions apart.

Figure 11:
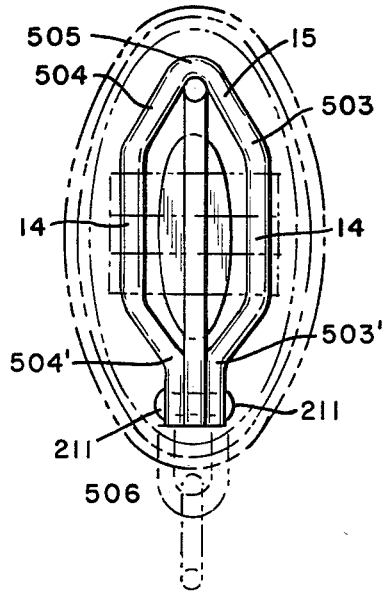
FIG. 11 is a front view of a further form of embodiment of the fastener according to the invention as pendant ear-ring.
Figure 12:
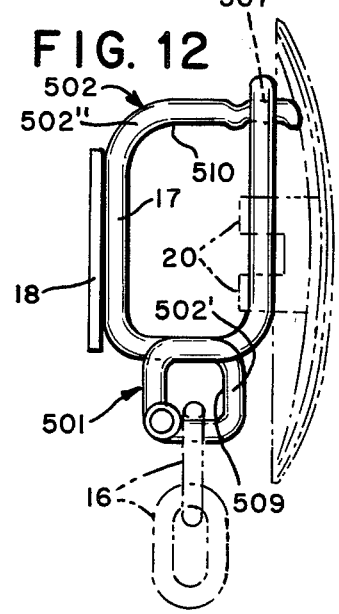
FIG. 12 is a side view of the embodiment of the fastener according to the invention as pendant ear-ring according to FIG. 11.
Figure 13:
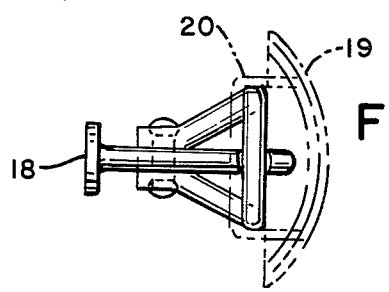
FIG. 13 is a plan view of the embodiment of the fastener according to the invention as pendant ear-ring according to FIGS. 11 and 12.

In the fastener designed as a pendant ear-ring shown in FIGS. 11 to 13, the hinged locking means 501 and the double hook 502 are made of wire in the form of parts bent into shape. The hinged locking means is S-shaped in a plane corresponding to the plane of the paper and oval-shaped construction in a vertical plane turned through 90 degrees in relation thereto. In this case, starting from the common pivot bearing connecting hinged locking means 501 and double hook 502, which pivot bearing is formed from the pivot pin 506 with shaped rivet heads 211 and the ends 503', 504', which are flattened and/or shaped as eyes, of the wire yoke (hinged locking means 501) enclosing the side portions 503, 504, there is first a diverging portion of the wire ends 503', 504' which changes over into parallel portions and leads into a roof-shaped porton 15, which, in its apex, forms the detent 505 for the counter detent in the form of the detent groove 507 that is formed at the free end of the double hook 502 and that may appropriately be produced by a bend in the inherently resilient free end of the double hook 502. The S-shaped double hook 502, which is mounted for rotation in the pivot bearing, by means of a wire eye on the pivot pin 506 between the ends 503', 504' of the wire, has, in the region of the pivot bearing, a small hook opening 509 which, together with the portion 503', 504' of the hinged locking means 501, which is constructed in mirror image (in side view), can serve as a suspension opening for a decorative pendant ear-ring, not illustrated in detail, and secured, for example to eyes indicated at 16. In the region of the detent catch 505, 507, the double hook has a comparatively larger hook opening 510 to suspend the fastener in a hole in the ear lobe.

The individual hooks 502' and 502" of the S-shaped double hook 502 are bent substantially into U-shape. An oval flat ear ornament is soldered onto the base 17 of the larger hook 502" and serves as an adornment. Ornament 18 must naturally be dimensioned, as FIG. 11 makes clear, so that it does not exceed the dimensions determined by the interior of the frame formed by the hinged locking means so as not to have an adverse effect on the relative crossing-over pivotal mobility of double hook and hinged locking means. It is further possible to fit a different or interchangeable flat ear decoration 19 selectively to the parallel side portions 14 of the hinged locking means 501 by means of clips 20 at its back, so that the ear-pendant fastener can be worn on the ear with a quite different decorative appearance, according to whether it is introduced into the ear lobe from the front or the rear.

Figure 17:
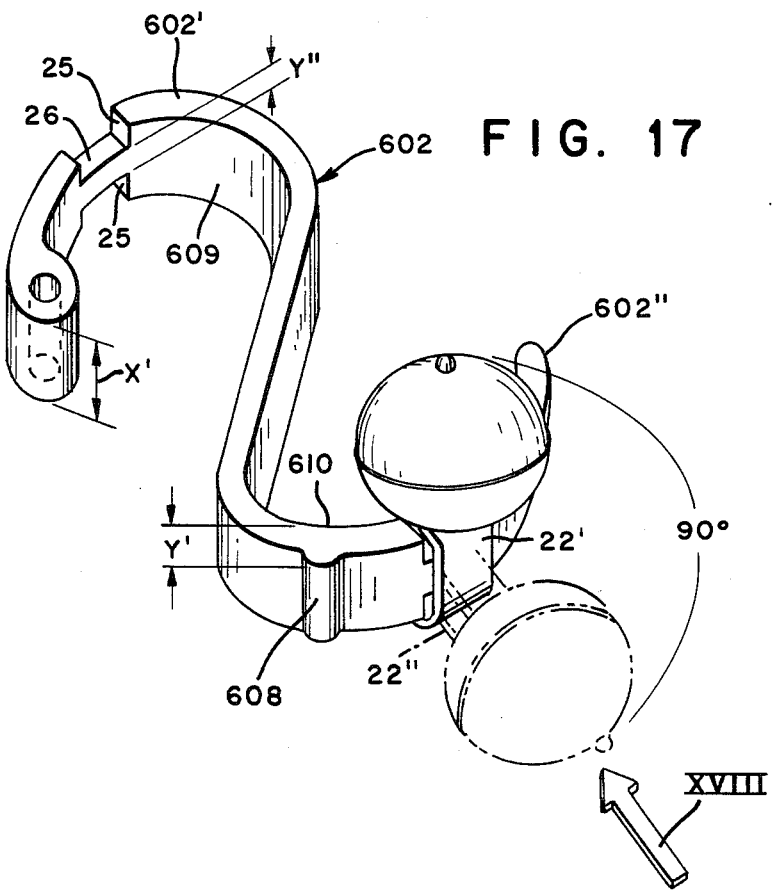
FIG. 17 shows a perspective illustration of the double hook of the fastener as shown in FIGS. 14 to 16 with pearl linked attached.
Figure 18:
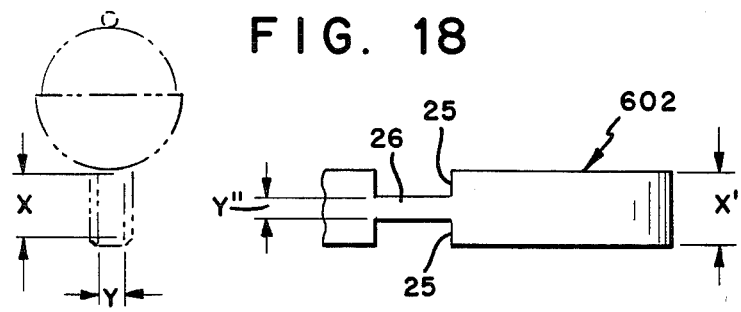
FIG. 18 shows a view of the hook in the direction of the arrow XVIII in FIG. 17.

In the fastener illustrated in FIGS. 14 to 18, the dished side portions 603, 604 of the hinged locking means 601 are formed as ornaments and covered wholly or partially with precious stones 21. The side portions 603, 604 are rigidly connected to one another, with parallel spacing, by means of the pivot pin 606 and the detent pin 605. In the snap-in position (FIG. 14), the side portions completely cover the hook openings 609, 610. This complete covering makes it necessary that connecting links 22, for example at the ends of a string of pearls 23, partially illustrated, do not, in the attached state, have an adverse effect on the free pivotal mobility of the double hook between the side portions of the hinged locking means. For this purpose, the double hook 602 has, at the sides of each hook 602', 602" adjacent to the side portions, in the region of the tension axis 24 (FIG. 14), substantially U-shaped recesses 25, situated opposite one another in mirror image, which recesses are separated by a web 26 and, together with the web 26, form an H shape as a whole. Double hook 602 and connecting links 22 have substantially the same rectangular cross-sectional profile and suspension openings. At the same time, as FIGS. 17, 18 show in particular, the corresponding dimensions are selected so that the length X of the suspension openings of the connecting links 22 corresponds substantially to the height X' of the double-hook profile and its width Y corresponds substantially to the maximum width Y' (measured including the finger-hold 608) of the hook profile and the thickness Y" of the web 26.

Figure 14:
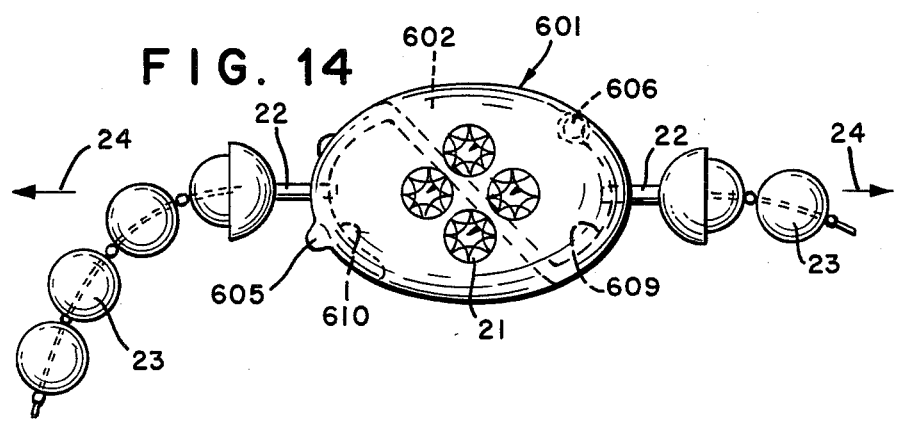
FIG. 14 shows a further form of the fastener according to the invention with attached parts of a string of pearls, in front view.
Figure 15:
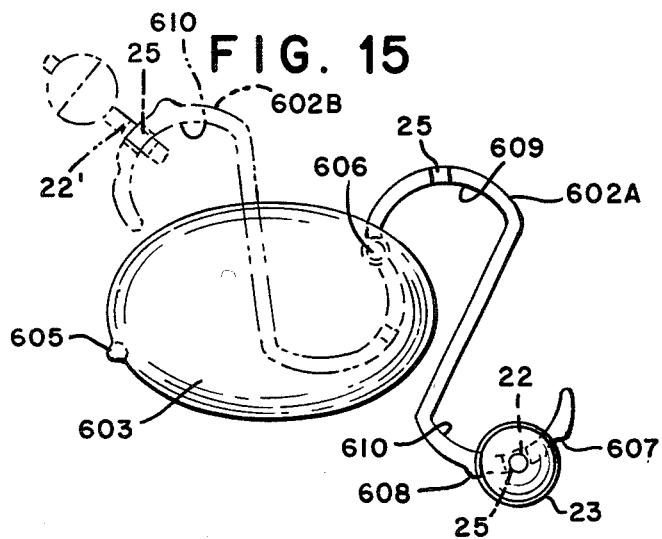
FIG. 15 is a further front view the fastener of FIG. 14 in the open position.
Figure 16:
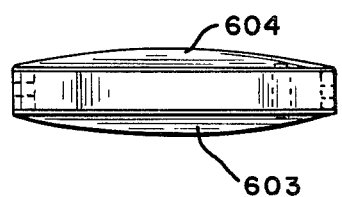
FIG. 16 is a side view of the fastener of FIGS. 14 and 15 in the closed position.

In order to connect the ends of a string of pearls, with the fastener in the open position (FIG. 15), the one connecting link 22 is suspended, in the position perpendicular to the plane of the paper, in the double hook 602 (A) as far as the recesses 25 in the hook opening 609 and there turned through 90 degrees. Then the double hook is pivoted inside the hinged locking means, with its detent depression 607 passing over the detent pin 605, into the position 602B shown in dot-dashed line, and the other connecting link 22' is suspended, in the same manner as described previously, in the hook opening 610 and the recesses 25 there, (FIG. 17), turned through 90 degrees as shown in dot-dashed line 22", and then the double hook 602 is brought back into the snap-in position (FIG. 14). In this manner, the ends of the string of pearls are reliably connected.

The fastener according to the invention is not restricted to the applications described but can be developed further in a similar manner, for example as key tag, without exceeding the scope of the invention.

It will be understood that each of the elements described above, or two or more together, may also find a useful application in other types of lock system configurations and valuable securing procedures differing from the types described above.

While the invention has been illustrated and described as embodied in the context of a one-piece fastener for jewelry, it is not intended to be limited to the details shown, since various modificaions and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fastener unit for jewelry comprising
    a first fastening member forming a double hook, which is of inherently resilient construction with hook openings and where the hook openings are directed oppositely in about mirror image at both sides of a tension axis of the hook;
    a second fastening member forming a generally double hook member;
    a pivot mount means for the first fastening member and for the second fastening member wherein the pivot mount means is disposed near a respective end of the first fastening member and of the second fastening member, the first fastening member and the second fastening member being detachably connected at their other ends, such that the first fastening member can pivot to opposite sides of the tension axis in relation to the second fastening member around said pivot mount means forming a common axis; a counter detent disposed at a second end of the first fastening member;
    a detent disposed at the second end of the second fastening member for releasably engaging the counter detent, whereby securing in position the first fastening member by its second end through the counter detent, wherein the first fastening member and the second fastening member hinged together are pivotable through 360 degrees crossing over the tension axis for the opening and closing of said hook opening and being so constructed that a pivotal movement in one direction opens one hook opening and closes the other and vice versa.

2. The fastener as claimed in claim 1 wherein one hook opening can be opened by a pivotal movement of the first fastening member providing a double hook in one direction, disengaging it from the detent, and the other hook opening can be opened by the pivotal movement in the other direction, passing over the detent.

3. The fastener as claimed in claim 1 wherein the second fastening member comprises arcuate portions which are directed in mirror image to the hook openings of the double hook and close the hook openings when the fastener is in a snap-in position.

4. The fastener as claimed in claim 1, wherein the hinged locking means is constructed in the form of a U-shaped yoke which, with its free ends, forms a common pivot bearing with one end of the double hook and surrounds this in the form of a gate and that the detent is disposed in the crosspiece of the yoke, which detent cooperates with the counter detent on the other end of the double hook during the opening and closing.

5. The fastener as claimed in claim 1 wherein the detent and the pivot mount bearing are formed from opposite sides of a frame-like housing forming said second fastener member and where the other two frame sides of which form extended bearing end plates of a pivot mount bearing forming the pivot mount means.

6. The fastener as claimed in claim 1 wherein the pivot mount bearing consists of a pivot pin forming the common axis of rotation of said hinged locking means and double hook with bearing end plates located on the ends of a pin and one end of the double hook mounted between the bearing end plates for free rotational movement in a bearing bore.

7. The fastener as claimed in claim 6 wherein the bearing end plates are formed from flat shaped parts disposed spaced parallelly apart and wherein the bearing end plates of the hinged locking means are of dished construction and are provided with recesses to receive the detent and the pivot pin.

8. The fastener as claimed in claim 7, wherein the bearing end plates are constructed in the form of castings and where recesses are cast as integral eyes.

9. The fastener as claimed in claim 7, wherein the bearing end plates are constructed in the form of shaped sheet-metal parts, and recesses which are formed thereon are provided as eyes.

10. The fastener as claimed in claim 7 wherein the bearing end plates are connected to one another, with parallel spacing, through a pivot pin and detent pin each inserted in opposite eyes.

11. The fastener as claimed in claim 10, wherein free edges of eyes can be bent over into annular grooves provided both in the detent pin and in the pivot pin for a rigid mutual connection of the bearing end plates.

12. The fastener as claimed in claim 10 wherein detent pin and pivot pin are riveted to the bearing end plates at their offset ends.

13. The fastener as claimed in claim 1 wherein the pivot mount means is provided by a pivot bearing formed from a pivot pin which forms the common axis of rotation of hinged locking means and double hook and is fixed at one end of the double hook, and bearing bores which are provided in the bearing endplates and in which the ends of the pivot pin are held for rotation and wherein a pivot pin of the pivot bearing is formed integral on the end of the double hook opposite to the counter detent.

14. The fastener as claimed in claim 1 wherein the double hook is resiliently deformable in the snap-in position in relation to the pivot mount means.

15. The fastener as claimed in claim 14 wherein the double hook is constructed in the form of a flat shaped stamped sheet-metal part.

16. The fastener as claimed in claim 13 wherein the double hook is a bent part made of spring wire.

17. The fastener as claimed in claim 1 wherein the detent disposed on the hinged locking means cooperates with the counter detent on the free end of the double hook as a radially acting spring-lever detent catch in a manner rendering it possible for the double hook to pass over the detent.

18. The fastener as claimed in claim 17 wherein the detent comprises a detent pin connecting the bearing end plates and wherein the counter detent comprises a detent notch.

19. The fastener as claimed in claim 17 wherein the counter detent comprises a detent depression.

20. The fastener as claimed in claim 17 wherein the detent notch is substantially V-shaped and is provided at the outer periphery of the double hook and wherein the V-shape of the detent notch forms an about of about 90 degrees.

21. The fastener as claimed in claim 1 wherein the hinged locking means is made in one piece as a U-shaped stamped sheet-metal part and is closed in the form of a frame by the pivot pin of a pivot bearing forming the pivot mount means.

22. The fastener as claimed in claim 21 wherein the detent is integrated in a crosspiece of the hinged locking means, situated opposite to the pivot bearing and wherein the detent comprises a tongue which projects from the crosspiece and is folded over inwards and which forms a detent projection which is substantially triangular in cross-section.

23. The fastener as claimed in claim 1 wherein side portions including bearing end plates of the hinged locking means and the double hook each have, in their end regions, holes which coincide in the snap-in position, for an inserted safety device.

24. The fastener as claimed in claim 1 wherein side portions including bearing end plates of the hinged locking means are constructed in the form of ornaments at their outer faces and are decorated with jewels.

25. The fastener as claimed in claim 1 wherein side portions including bearing end plates of the hinged locking means are shaped such that, in the snap-in position, they wholly or partially cover the hook openings of the double hook.

26. The fastener as claimed in claim 25 wherein the double hook comprises a profile which is substantially rectangular in cross section and the double hooks are each provided with two recesses, which recesses are disposed in the tension axis and in mirror image to each other at their sides adjacent to the side portions, for attaching and securing flat connecting links.

27. The fastener as claimed in claim 25 wherein suspension recesses are substantially U-shaped in constructon and, as a whole in their mirror image relationship, form an H shape.

28. The fastener as claimed in claim 26 wherein suspension oenings of the connecting links are similar in construction to the cross-section of the double hook and are shaped so that their length (X) corresponds substantially to the height (X') of the hook profile and their width corresponds substantially to the maximum width (Y') of the hook profile and the thickness (Y") of the web between the opposite recesses and wherein, when the fastener is in the open position, the suspension links can be introduced into the hook openings with their suspension openings coinciding in position with the cross-section of the double hook and can be brought, by a subsequent pivotal movement through 90 degrees inside the recesses, into a locking position which, when the double hook is in the snap-in position, can be reached by coincidence between the hooks and the side portions including bearing end plates.

29. The fastener as claimed in claim 1 where it is formed as a pendant ear-ring.

30. The fastener as claimed in claim 29 wherein the suspension opening, adjacent to the detent catch and formed from the one hook opening and the arcuate portions of the hinged locking means directed in mirror image, is larger than the suspension opening adjacent to the pivot bearing.

31. The fastener as claimed in claim 30 wherein the side walls of the hinged locking means form an oval frame lying in the plane of the extent of the pivot bearing and wherein the frame comprises substantially parallel portions in the region of the maximum width of the oval.

32. The fastener as claimed in claim 30 wherein the parallel side-wall portions are brought together in a roof shape forming the counter detent.

33. The fastener as claimed in claim 29 wherein double hook and hinged locking means consist of bent parts made of material in the form of wire.

34. The fastener as claimed in claim 29 wherein a flat ear ornament can be fitted to the walls of the hinged locking means in the region of the larger suspension opening and wherein the region of the double hook situated opposite to the region for fitting the flat ear ornament to the hinged locking means is provided with a further fixed flat ear ornament.

35. The fastener as claimed in claim 34 wherein the flat ear ornament is oval in construction and is so dimensioned that the pivotal mobility of the double hook crossing over the hinged locking means is ensured.

36. The fastener as claimed in claim 1 wherein the the first fastener member and the second fastening member have substantially the shape of a figure 8 in a snap-in position and when viewed in the pivotal plane.

37. The fastener as claimed in claim 1 wherein the first fastening member is provided as a key holder.

38. The fastener as claimed in claim 1 wherein part hooks of the double hook starting from a point of the hinge and from a pint of the detent and going to the inflection point between the two part hooks cover each with their curvature radii directions an angular range of at least about 135 degrees.

39. A fastener unit comprising
a hinge disposed at a hinge axis;
a frame supporting the hinge at the hinge axis;
a double hook being hinged near one end at the hinge axis; which is of inherently resilient construction with hook openings and with hook tension axis and wherein the hook openings are directed oppositely in about mirror image at both sides of a tension axis of the hook and wherein the hinge is disposed near a respective end of the double hook and of the frame;
a detent provided at a part of the frame relative remote from the hinge point; and
a counter detent provided at the double hook near its second end for releasably engaging the detent and thereby locking the fastener, where the double hook can rotate by about 360 degrees around said hinge axis forming a common axis versus the frame to opposite sides of the tension axis in relation to the frame and crossing over the tension axis for the opening and closing of said hook opening and being so constructed that a pivotal movement in one direction opens one hook opening and closes the other and vice versa such that each opening of the double hook is accessible for toroidal material to be placed on a respective hook end and to be held by the fastener after engagement of detent and counter detent.

* * * * *